United States Patent [19]

Ueno et al.

[11] 4,294,712

[45] Oct. 13, 1981

[54] SELF-LUBRICATING BEARING

[75] Inventors: Toshihiko Ueno; Teruhisa Tomogane, both of Kobe, Japan

[73] Assignee: Bando Chemical Industries, Ltd., Kobe, Japan

[21] Appl. No.: 180,166

[22] Filed: Aug. 21, 1980

[30] Foreign Application Priority Data

Aug. 29, 1979 [JP] Japan .................................. 54-110944
Sep. 26, 1979 [JP] Japan .................................. 54-124401
Mar. 17, 1980 [JP] Japan .................................. 55-34339
Mar. 17, 1980 [JP] Japan .................................. 55-34340
Mar. 17, 1980 [JP] Japan .................................. 55-34341

[51] Int. Cl.$^3$ .................. C10M 5/10; C10M 5/02; C10M 7/14; C10M 7/04
[52] U.S. Cl. .................................. 252/12; 585/3; 585/10
[58] Field of Search .................. 252/12, 12.2; 585/3, 585/10

[56] References Cited

U.S. PATENT DOCUMENTS 3,830,860  8/1974  Nagase et al. .................. 585/3
4,100,245  7/1978  Horikawa et al. .................. 252/12

Primary Examiner—Delbert E. Gantz
Assistant Examiner—Irving Vaughn
Attorney, Agent, or Firm—Moonray Kojima

[57] ABSTRACT

A self-lubricating bearing comprising a molded composite material prepared by blending lubricating oil, polynorbornene type resin and/or expanded graphite, and a main bearing material comprising a self-lubricating and abrasive resistant synthetic resin. Metal powders may be added to the synthetic resin as the main bearing material. The inventive bearing can perform under heavy loads and have a long life time.

11 Claims, No Drawings

SELF-LUBRICATING BEARING

BACKGROUND OF THE INVENTION

This invention relates to a self-lubricating bearing.

Self-lubricating bearings are known in the art, and are usually manufactured of such materials as polyamides, polyacetals, polybutylenephthalates, polycarbonates and polytetrafluoroethylene. Although such known bearings have good self-lubricating properties and hence good frictionless properties, they have the distinct disadvantage of being usable only with small loads. They are generally incapable of being operated with large loads. Also the life of such prior bearings is not very long.

To improve such bearings, in the prior art, experiments have been conducted admixing lubricating oil into the synthetic resin. In one case, active carbon was used as a carrier for the oil in the admixing process. Also, other synthetic resins, which can act as a carrier for lubricating oil, have been used. For example, there have been used a copolymer of ethylene-propylene-diene monomers, butadiene rubber, isoprene rubber, etc. However, disadvantageously, the oil carrier comprised of the synthetic rubber do not have a large capacity for absorbing lubricating oil. For example, at most, one volume of rubber will absorb three volumes of lubricating oil. Moreover, when a capacity amount of oil is absorbed, a large amount of synthetic resin is used and thus causes the properties of the main bearing material, such as synthetic resin, to be adversely affected, such as causing a decrease in mechanical strength and decrease in slidability.

It has been found that the known lubricating oil carriers, such as activated carbon, synthetic rubber and metal salts have by themselves very little lubricity. Thus, upon contact of the bearing comprised of such material as carrier, with a corresponding part, such as a rotating shaft, there is no satisfactory slidability. Also, since the above mentioned oil immersed resin, which is the main bearing material, is not subjected to any quality improving treatment of effect high thermal conductivity, low linear expansion, the bearng is liable to be directly and adversely affected by the rotational friction on the contact surface. Both materials would lose their dimensional stability and display the so-called "shaft embracing" and "melt adhesion" phenomena.

Accordingly, there is urgent need existing for a self-lubricating bearing which has good self-lubricating properties and can withstand heavy loads and be utilizable for an extended period of time, and have a long life time.

SUMMARY OF THE INVENTION

An object of the invention is to eliminate the foregoing and other deficiencies and disadvantages of the prior art.

Another object is to produce an self-lubricating bearing which has superior properties of slidability, abrasion resistance, dimensional stability and which has a long usage life.

A further object of the invention is to provide a self-lubricating bearing which comprises synthetic resin and has less heat deformation and has dimensional stability against heat generation.

The foregoing and other objects of the invention are attained in a self-lubricating bearing which is produced from a blend of lubricating oil, polynorbornene type resin and/or expanded graphite for use as carrier of the lubricating oil, and a synthetic resin which has good slidability and abrasion resistance properties. The expanded graphite enables a gain in lubricating performance, even in the case of lower oil content. The above can be further supplemented by the use of metal powders, such as kelmet (comprising Cu-Pb) alloy powder or bronze powder, to improve stability, abrasion resistance, dimensional stability and heat conductivity. The foregoing invention advantageously improves also the heat conductivity and lowering of linear expandability and slidability. The bearing can be made with a conventional molding machine, in a sleeve form, for example, by molding a blend prepared by homogeneously mixing lubricating oil, polynorbornene type resin and/or expanded graphite, with synthetic resin of superior slidability and abrasion resistance. The synthetic resin may be selected from the group consisting of polyamides, polyacetyls, polybutylenephthalates, polycarbonates, and polytetrafluoroethylenes.

It is preferable to use less than 40 volume percent of lubricating oil, more preferably 1 to 40 volume percent and preferably 0.1 to 20 volume percent of polynorbornene resin, and remainder synthetic resin. When using expanded graphite the amount should be within the range of 0.5 to 20 volume percent and lubricating oil within the range of 1 to 20 volume percent, with the remainder being synthetic resin. The term "volume percent" is based on the volume of the bearing. When using both polynorbornene resin and expanded graphite, or ordinary graphite, the amounts used should be 1 to 40 volume percent lubricating oil; 0.1 to 20 volume percent polynorbornene resin and 0.5 to 20 volume percent expanded graphite or ordinary graphite, and remainder synthetic resin. The synthetic resin forming the main bearing material may be substituted in part of from 0.5 to 50 volume percent by a metal powder, such as kelmet alloy powder or bronze powder.

Advantageously, the inventive bearing has superior self-lubricating properties, and is able to withstand heavy loads. Moreover the inventive bearing has a substantially longer life time than the prior art bearings.

A feature of the invention is the use of polynorbornene type resin as a carrier for lubricating oil, the polynorbornene resin having a molecular weight of more than two million and a glass transition point of about 35° C.

Another feature of the invention is the use of expanded graphite as a carrier for lubricating oil.

A further feature is the use of a combination of polynorbornene resin and expanded graphite as carriers of lubricating oil.

Another feature is the use of 1 to 40 volume percent of lubricating oil, 0.1 to 20 volume percent of polynorbornene and/or 0.5 to 20 volume percent expanded graphite and remainder synthetic resin.

A still further feature is the use of metal powders in the bearing, such as preferably, kelmet alloy powders or bronze metal powders, in an amount of from 0.5 to 50 volume percent.

Another feature is the absorbility ratio of graphite to lubricating oil being from 1/0.2 to 1/5; and wherein the expanded graphite is the product of treating graphite at 200° to 1000° C. and expanded in the C-axis direction to become porous and lubricating oil absorbent.

DETAILED DESCRIPTION OF THE PREFERRED EMBODIMENTS

The polynorbornene type resin used in the invention preferably has a molecular weight of more than two million and has a glass transition point of about 35° C. A polynorobornene type resin comprising vulcanizing agent may be used. Such polynorbornene type resins have a porous structure and can absorb a considerable amount of lubricating oil, such as, at most, about ten times its volume. Advantageously, this property enables the use of less carrier material for the use of the same amount of lubricating oil, and thus reduce the problem of decreasing the physical properties by use of greater amount of carrier material, such as was prevalent in the prior art. The amount of polynorbornene to be used is preferably within the range of from 0.1 to 20 volume percent, based upon the volume of the bearing. The same basis will apply throughout the specification and claims.

As lubricating oil, one or more of the following can be used: conventional lubricating oils, such as aromatic lubricating oil, naphthenic lubricating oil, parafinic lubricating oil, such as spindle oil, turbine oil, machine oil, dynamo oil and synthetic oils, such as hydrocarbon, ester, polyglycol and silicone. The amount of lubricating oil to be used is preferably less than 40 volume percent and more preferably between 1 to 40 volume percent.

The expanded graphite is a type of graphite having layered carbon atoms and is prepared by oxidizing natural graphite of high crystallinity, with an oxidizing agent, and expanded irreversibly by heating at 200° to 1000° C. for suitable length of time thereby effecting expansion in the C-axis direction thereby resulting in a porous graphite having suitable oil absorbability. The absorbing ratio of graphite to lubricating oil is preferably between 1 cc/0.2 cc to 1 cc/5 cc. It has been found that since the graphite is a solid lubricant, it is sufficient for the bearing to have good slidability that the amount of lubricating oil to be absorbed by this expanded graphite be half as much as in the case of polynorbornene resin.

The main bearing material comprises a synthetic resin having superior slidability and abrasion resistance, such as polyamides, polyacetyls, polybutylenephthalates, polycarbonates, and polytetrafluoroethylenes. The resin is preferably in powder form, but can be employed in other forms with suitable other steps.

The main bearing material may comprise other components in combination with the synthetic resin. For example, to enhance heat conductivity without decreasing slidability and to lower the coefficient of linear expansion of the bearing material, metal powders may be added, for example, preferably kelmet alloy powders or bronze powders. Such components may be used preferably in an amount of from 0.5 to 50 volume percent. These may be added to the mixture concurrently with the synthetic resin which forms the main bearing material.

As above discussed, the carrier material may be the polynorbornene resin used alone, or expanded graphite used alone, or a combination of the polynorbornene resin and expanded graphite. When using the polynorbornene resin alone, first lubricating oil in an amount of from 1 to 40 volume percent is homogeneously mixed with 0.1 to 20 volume percent of polynorbornene resin to form a gel like substance. Then, the mixture is further admixed with the remaining volume percent of the main bearing material, such as synthetic resin. Pellets are formed using an extruding molding die. Then, the resulting pellets are supplied to a conventional molding machine whereat a bearing of predetermined size is produced.

When using expanded graphite alone, the graphite is first expanded as explained above. Then, 1 to 20 volume percent of lubricating oil is homogeneously mixed with 0.5 to 20 volume percent graphite to form a gel like substance. Then, the resulting mixture is further admixed with remaining volume percent of the main bearing material such as synthetic resin and pellets are formed by an extruding die. The pellets are then used in a conventional molding machine to form a bearing of predetermined size.

When using a combination of polynorbornene resin and expanded graphite, 1 to 40 volume percent of lubricating oil is homogeneously mixed with 0.1 to 20 volume percent of polynorbornene and 0.5 to 20 volume percent of expanded graphite to form a gel like substance. To that mixture is then admixed remaining volume percent of the main bearing material such as synthetic resin and then made into pellets by an extruder die. The pellets are then used in a conventional molding machine to form a bearing of predetermined size. The amount of polynorbornene and expanded graphite used may be so that the same amount of lubricating oil is absorbed in the two components. The polynorbornene resin may even contain a larger amount of lubricating oil since the graphite is a solid lubricant. In this combination, it has been discovered that instead of expanded graphite, ordinary graphite may be used.

In either of the three above discussed procedures, after the gel like substance is blended by blending the lubricating oil, polynorbornene resin and/or expanded graphite, the other materials such as metal powders may be admixed into the gel like substance with the synthetic resin.

The invention will now be further illustrated with actual examples.

EXAMPLE 1

A lubricating oil (trade namde of Daphne Super Mechanic Oil 100) in an amount of 30 volume percent wad added to a polynorbornene type synthetic resin elastomer (trade namde of NORSOREX) in an amount of 8 volume percent. The resulting material was mixed well in a Henschel mixer, and subsequently was allowed to stand at room temperature for 12 hours to obtain a transparent gel like substance which was comprised of mutually well dissolved lubricating oil and polynorbornene type synthetic elastomer. The the resulting mutually dissolved mixture, polyacetyl resin powder (trade name of Duracon M 90-02) in an amount of 62 volume percent was admixed using a Henschel mixer. The resultant was pelletized using an extrusion molding die and then subjected to injection molding to produce a predetermined dimensional bearing.

EXAMPLE 2

A lubricating oil (trade name Daphne Super Mechanic Oil 100) in an amount of 30 volume percent was added to a polynorbornene type synthetic resin elastomer (trade name of NORSOREX) in an amount of 8 volume percent. The resultant mixture was treated as in the case of Example 1, to obtain a gel like substance. To the obtained mixture, polyacetyl resin powder (trade name Duracon M 90-02) in an amount of 42 volume percent and sprayed Kelmet alloy powder (Pb 30%) in an amount of 20 volume percent were admixed and then mixed by Henschel mixer. From the resultant mixture, a bearing of predetermined size was produced using the same procedure as in Example 1.

EXAMPLE 3

Extensible graphite was expanded in the C-axis direction by heating at 200° C. for a suitable time to cause the graphite to have the ability to absorb lubricating oil. The expanded graphite in an amount of 10 volume percent was mixed together with lubricating oil in an amount of 20 volume percent. Admixed to the resulting material was a polyacetal resin powser (trade name of Duracon M90-02) in an amount of 70 volume percent using a mixer. Pellets were obtained by extrusion molding of the above obtained material. The pellets were then subjected to injection molding to produce predetermined dimensional bearings.

EXAMPLE 4

By using the method of Example 3 a bearing was produced, except instead of using polyacetyl resin powder in an amount of 70 volume percent, polyacetyl in an amount of 55 volume percent was used together with a kelmet alloy powder in an amount of 15 volume percent.

EXAMPLE 5

A polynorbornene type synthetic elastomer (trade namde NORSOREX) in an amount of 8 volume percent, graphite expanded in the C-axis direction by heat treatment at a high temperature between 200° to 1000° C. for a suitable length of time, in an amount of 8 volume percent and a lubricating oil (Daphne Super Mechanic oil 100) in an amount of 20 volume percent were mixed together in a mixer. The resultant mixture was allowed to stand at room temperature for 12 hours to obtain a homogeneously mutually dissolved gel like substance comprising lubricating oil and its carrier materials. To this gel like substance, polyacetyl resin powder (trade name Duracon M90-02) in an amount of 64 volume percent was admixed in a mixer. The resultant was treated to form pellets thereof and then subjected to molding in an injection molding machine to produce bearings of predetermined dimensional sizes.

EXAMPLE 6

A lubricating oil (trade name Daphnee Super Mechanic Oil 100) in an amount of 30 volume percent was added to a polynorbornene type synthetic elastomer (trade name NORSOREX) in an amount of 10 volume percent. The resultant mixture was mixed in a mixer and allowed to stand at room temperature for 12 hours to obtain a transparent homogeneously dissolved gel like substance which comprised lubricating oil and carrier. To this gel like substance were added 8 volume percent expanded graphite and 52 volume percent polyacetal powder (trade name Duracon M90-02) and the resultant was mixed in a mixer. The obtained mixture was molded into pellets by extruding die method. The pellets were then subjected to injection molding to produce a bearing of predetermined size.

EXAMPLE 7

A polynorbornene type synthetic resin (trade name NORSOREX) in an amount of 6 volume percent was added to lubricating oil (trade name Daphnee Super Mechanic Oil 100) in an amount of 30 volume percent. Then the resultant was mixed in a Henschel mixer and allowed to stand at room temperature for 12 hours to obtain a homogeneous gel like substance. Then, to the resultant mixture there was admixed, using a Henschel mixer, graphite of scale form in an amount of 10 volume percent, sprayed kelmet alloy power in an amount of 15 volume percent and powder of polyacetyl resin in an amount of 39 volume percent. The resultant mixture was pelletized and then subjected to injection molding to produce a bearing of predetermined size.

EXAMPLE 8

A self lubricating bearing was obtained with the method of Example 2, except in lieu of the sprayed kelmet alloy powder, bronze powder was used.

EXAMPLE 9

A polynorbornene type synthetic elastomer (trade name of NORSOREX) in an amount of 4 volume percent was added to lubricating oil (trade name of Daphnee Super Mechanic Oil 100) in an amount of 20 volume percent. The obtained mixture was mixed in a Henschel mixer and was allowed to stand for 12 hours at room temperature. To the obtained gel like substance, graphite of scale form in an amount of 20 volume percent, sprayed kelmet alloy powder in an amount of 15 volume percent and polyacetyl resin powder in an amount of 41 volume percent were added and mixed in a Henschel mixer. The resultant was formed into pellets as in Example 1. The pellets were subjected to injection molding to produce a bearing of predetermined size.

EXAMPLE 10

30 volume percent of lubricating oil (trade name Daphnee Super Mechanic Oil 100), 6 volume percent of polynorbornene synthetic resin elastomer (trade name of NORSOREX), and 6 volume percent of expanded graphite, which expanded graphite was expanded in the C-axis direction by subjecting it to a heat treatment at 300° C. to produce a porous structure, were placed into a Henschel mixer and mixed well and then allowed to stand for 12 hours to obtain a homogeneously dissolve gel like substance. To the resultant mixture sprayed kelment alloy powder (Pb 30%) in an amount of 20 volume percent and polyacetal resin (trade name Doracon M90-02) in an amount of 38 volume percent were admixed in a Henschel mixer, and pelletized as in Example 1. A bearing of predetermined size was produced by injection molding.

EXAMPLE 11

Into a Henschel mixer 20 volume percent of lubricating oil (trade name Daphnee Super Mechanic Oil 100) and 5 volume percent of polynorbornene type synthetic resin elastomer (trade name of NORSOREX) were placed and mixed in a Henschel mixer and then allowed to stand at room temperature for 12 hours to obtain a homogeneously dissolved transparent gel like substance. To this mixture, 7 volume percent of expanded graphite, 20 volume percent of sprayed kelmet alloy powder (Pb 30%) and 48 volume percent of polyacetyl resin (trade name of Duracon M 90-02) powder were added and treated with the same process method as Example 1.

In the above examples, the words "predetermined size" denotes size of 8 mm$\phi$ × 10 mm$\phi$ × 15 mm; and the bearings were tempered at the rate of Japanese Industrial Standard S45C. In the test of slidability and abrasion resistance of the bearing, shafts of surface roughness of 3.6S were used. In these tests the shaft load was 5 Kg/cm² at 3000 rpm running and 2 Kg/cm² at 7500 rpm speed. In the Examples, after mixing of the lubricating oil with the carrier, the mixture was allowed to stand for 12 hours to for the gel like substance. The test results are shown below in Table 1.

COMPARATIVE EXAMPLE

For the comparative example shown in Table 1, a conventional bearing comprising polyacetal resin and lubricating oil, was used.

From Table 1, it is apparent the bearing of the instant invention as compared to the conventional bearing, has superior properties, such as abrasion resistance, slidability, and smaller temperature increase. These superior properties contribute to produce dimensional stability of the bearing.

TABLE 1

| | On the 3000 rpm running | | | On the 7500 rpm running | | |
|---|---|---|---|---|---|---|
| Example | abrasion coefficient | friction coefficient | Temperature rise (°C.) | abrasion coefficient | friction coefficient | Temperature rise (°C.) |
| 1 | 2.5 | 0.075 | 26 | 4.90 | 0.078 | 44 |
| 2 | 1.59 | 0.065 | 19 | 4.20 | 0.06 | 35 |
| 3 | 2.30 | 0.085 | 29 | 5.50 | 0.080 | 48 |
| 4 | 1.95 | 0.070 | 24 | 3.90 | 0.072 | 38 |
| 5 | 1.49 | 0.06 | 19 | 3.55 | 0.061 | 37 |
| 6 | 1.50 | 0.06 | 18 | 3.59 | 0.058 | 36 |
| 7 | 1.59 | 0.060 | 22 | 3.70 | 0.061 | 36 |
| 8 | 1.58 | 0.063 | 23 | 3.69 | 0.062 | 38 |
| 9 | 1.60 | 0.068 | 24 | 3.71 | 0.069 | 40 |
| 10 | 1.45 | 0.059 | 19 | 3.20 | 0.061 | 34 |
| 11 | 1.48 | 0.060 | 20 | 3.33 | 0.062 | 35 |
| Comp. exam. | 5.21 | 0.095 | 31 | baked melt adhesion | baked melt adhesion | baked melt adhesion |

Note:
unit dimension of the friction coefficient is $10^{-6}$ mm/kg . cm² . m . min . $^{-1}$hr With respect to the lubricatin oil absorbility, advantageously the invention uses less than 20 volume percent of both polynorbornene type synthetic resin elastomer and/or expanded graphite. There is no necessity for any large amount of carrier to be used such as is true in the prior art, such as activated carbon and synthetic rubber, which adversely affect the mechanical properties of the main bearing material. Furthermore, advantageously, according to the invention, the main bearing material may also comprise metal powders which improve the physical properties of the bearing, such as heat conductivity and linear expansion. Consequently, the invention is able to realize desirable dimensional stability. Thus, advantageously, the improvement of mechanical strength of the bearing improves its usage life.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A self-lubricating bearing comprising 1 to 40 volume percent lubricating oil; 0.1 to 20 volume percent carrier for said lubricating oil, said carrier being selected from the group consisting of polynorbornene resin, expanded graphite and mixtures thereof; and remainder main bearing material comprising another synthetic resin having properties of slidability and abrasion resistance.

2. The bearing of claim 1, wherein said carrier is polynorbornene resin have a molecular weight of more than 2 million and a glass transition point of about 35° C. and used in an amount of from 0.1 to 20 volume percent.

3. The bearing of claim 1, wherein said carrier is polynorbornene resin comprising a vulcanizing agent.

4. The bearing of claim 1, wherein said carrier is an expanded graphite prepared by heating ordinary graphite at 200° to 1000° C. for a suitable period of time, to expand same in the C-axis direction, and used in an amount of from 0.5 to 20 volume percent, wherein said lubricating oil is used in an amount of from 1 to 20 volume percent.

5. The bearing of claim 4, wherein the absorbency ratio of graphite to lubricating oil ranges from 1 cc/0.2 cc to 1 cc/5 cc.

6. The bearing of claim 1, wherein said carrier is a combination of polynorbornene resin and expanded graphite.

7. The bearing of claim 6, wherein said expanded graphite is replaced by ordinary graphite.

8. The bearing of claim 1, wherein said main bearing material comprises a combination of synthetic resin and metal powder, said metal powder being used in an amount of from 0.5 to 50 volume percent.

9. The bearing of claim 8, wherein said metal powder is selected from the group consisting of kelmet alloy powder and bronze powder.

10. The bearing of claim 1, wherein said lubricating oil is selected from the group consisting of aromatic oil, naphthenic oil, parafinic oil and synthetic oil.

11. The bearing of claim 1, wherein said synthetic resin is selected from the group consisting of polyamides, polyacetals, polybutylenephthalates, polycarbonates, and polytetrafluroethylenes.

* * * * *